Dec. 2, 1958 M. J. PRIEFERT 2,862,597
APPARATUS FOR LOADING BALED FARM CROPS
Filed Feb. 14, 1956 3 Sheets-Sheet 1

INVENTOR.
MARVIN J. PRIEFERT
BY Rudolph L. Lowell
ATTORNEY.

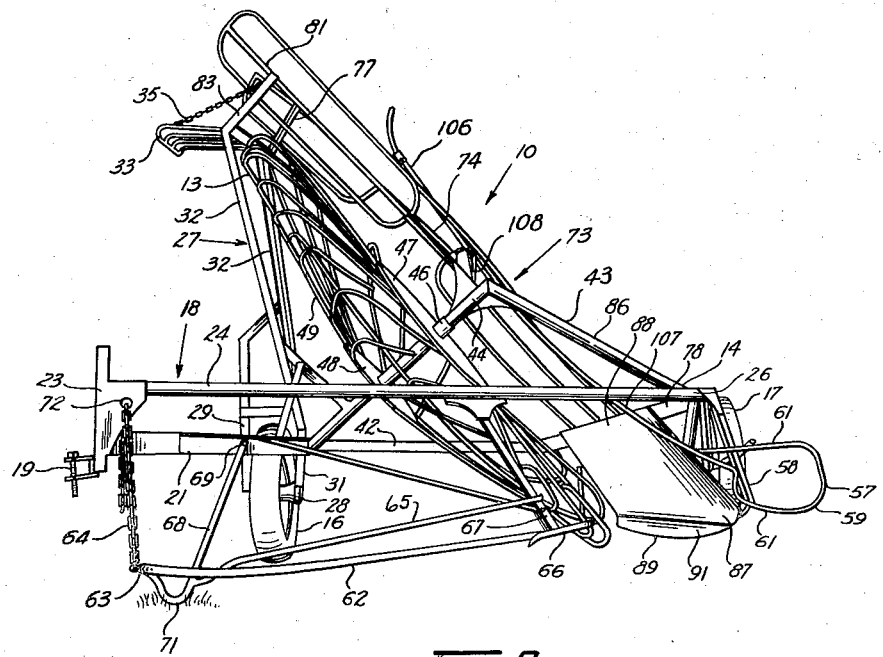
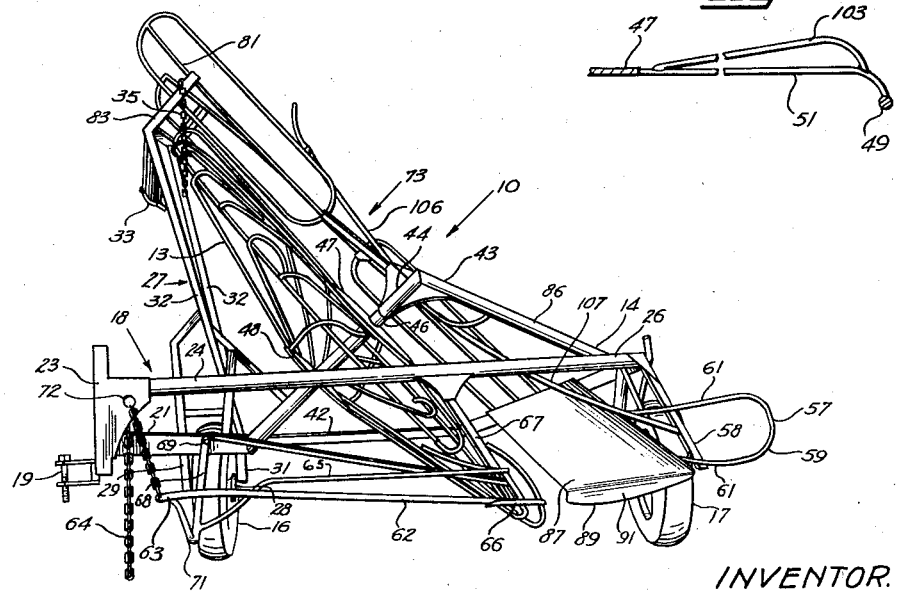

Dec. 2, 1958   M. J. PRIEFERT   2,862,597
APPARATUS FOR LOADING BALED FARM CROPS
Filed Feb. 14, 1956   3 Sheets-Sheet 3
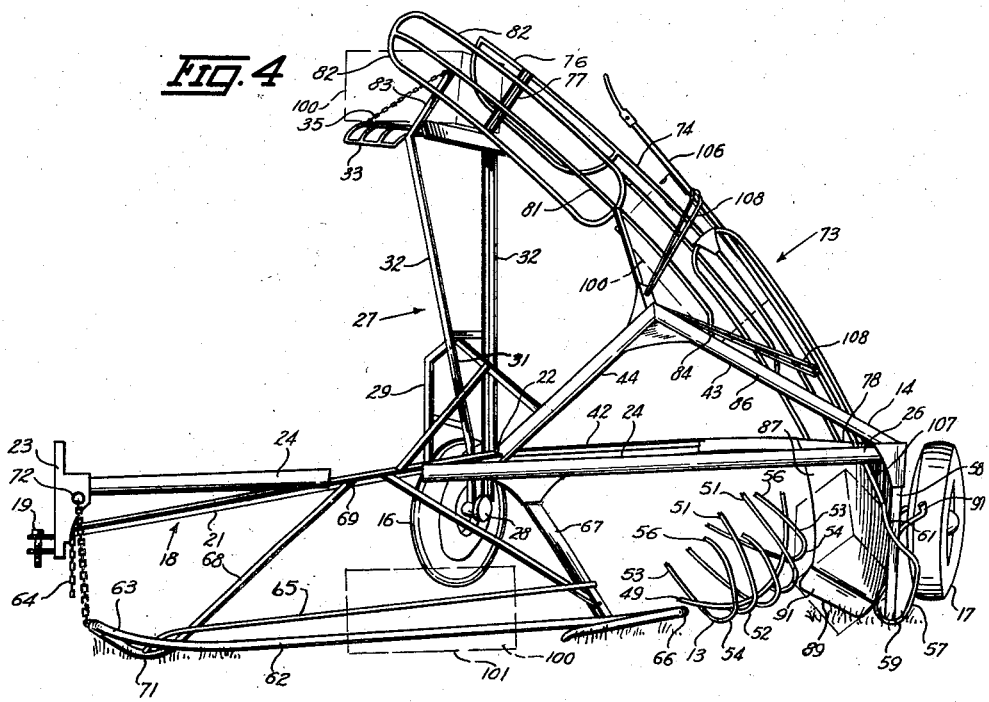
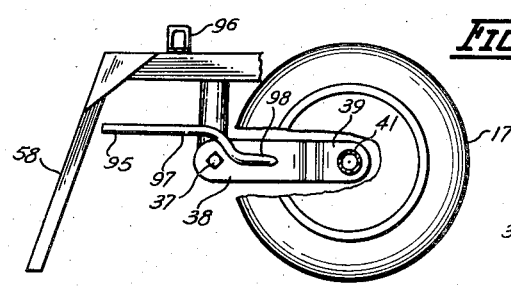
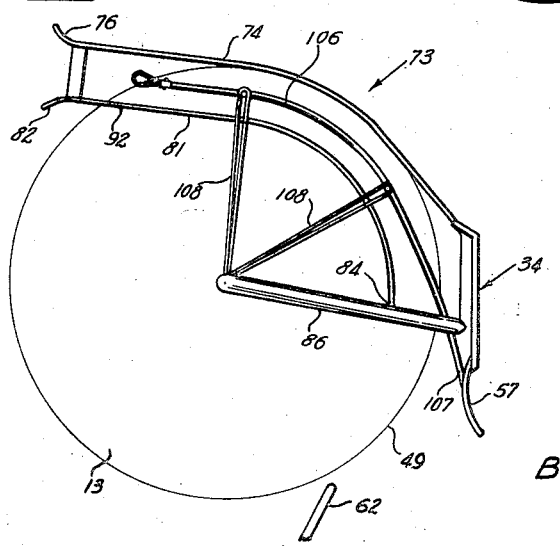
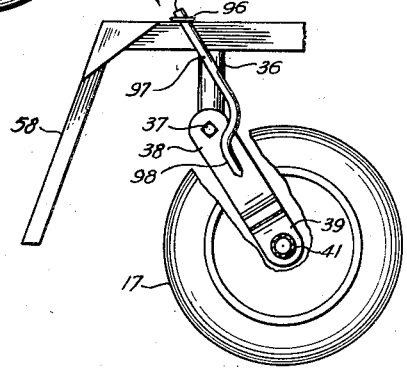
INVENTOR.
MARVIN J. PRIEFERT
BY Rudolph L. Lowell
ATTORNEY.

United States Patent Office 2,862,597
Patented Dec. 2, 1958

2,862,597

APPARATUS FOR LOADING BALED FARM CROPS

Marvin J. Priefert, Belvidere, Nebr.

Application February 14, 1956, Serial No. 565,359

5 Claims. (Cl. 198—7)

This invention relates generally to material loading devices and more particularly to apparatus for loading baled farm crops from a field onto a transport vehicle. This application is a continuation-in-part of my prior co-pending application Serial No. 462,446 filed October 15, 1954, now abandoned.

An object of this invention is to provide an improved bale loader.

A further object of this invention is to provide a bale loader which includes a ground engaging loading wheel rotatable in response to forward travel of the loader in a direction to provide for the upward travel on the wheel of bales directed thereto.

Another object of this invention is to provide a towed bale loader which is adapted to be arranged adjacent a bale receiving vehicle for picking up bales in a field and delivering them to the vehicle.

A further object of this invention is to provide a bale loader which includes a ground driven inclined loading wheel and guide members arranged forwardly of the wheel for directing bales in a field onto the wheel for upward travel thereon.

Another object of this invention is to provide a bale loader which includes a frame having an inclined bale loading wheel movably mounted thereon for selective movement to a ground engaging bale loading position and to a raised transport position.

A further object of this invention is to provide a bale loader which includes a portable frame and an inclined loading wheel rotatably mounted on the frame for continuous ground engagement during travel of the portable frame in a field and a guide frame structure for directing bales in the field onto the wheel and off the wheel onto a platform carried on the portable frame.

A further object of this invention is to provide a bale loader which is simple in construction, economical to manufacture, and efficient in operation in loading baled farm crops from a field onto a transport vehicle.

Further objects, features and advantages of this invention will become apparent from a consideration of the following description when taken in connection with the accompanying drawing in which:

Figs. 2 and 3 are front perspective views of the bale loader of this invention, showing the loading and transport positions, respectively, of the loader;

Fig. 4 is a front perspective view of the bale loader of this invention, with the loading wheel therefor broken away for the purpose of clarity, and showing a bale in progressively moved positions on the loader;

Figs. 5 and 6 are fragmentary side elevational views of a portion of the bale loader of this invention showing the positions of one of the loader ground wheels in the loading and transport positions, respectively, of the loader;

Fig. 7 is a diagrammatic top plan view of the loading wheel and bale guide frame which form part of the bale loader of this invention; and Fig. 8 is a fragmentary detail sectional view of a portion of the bale loading wheel in this invention.

Figure 1:
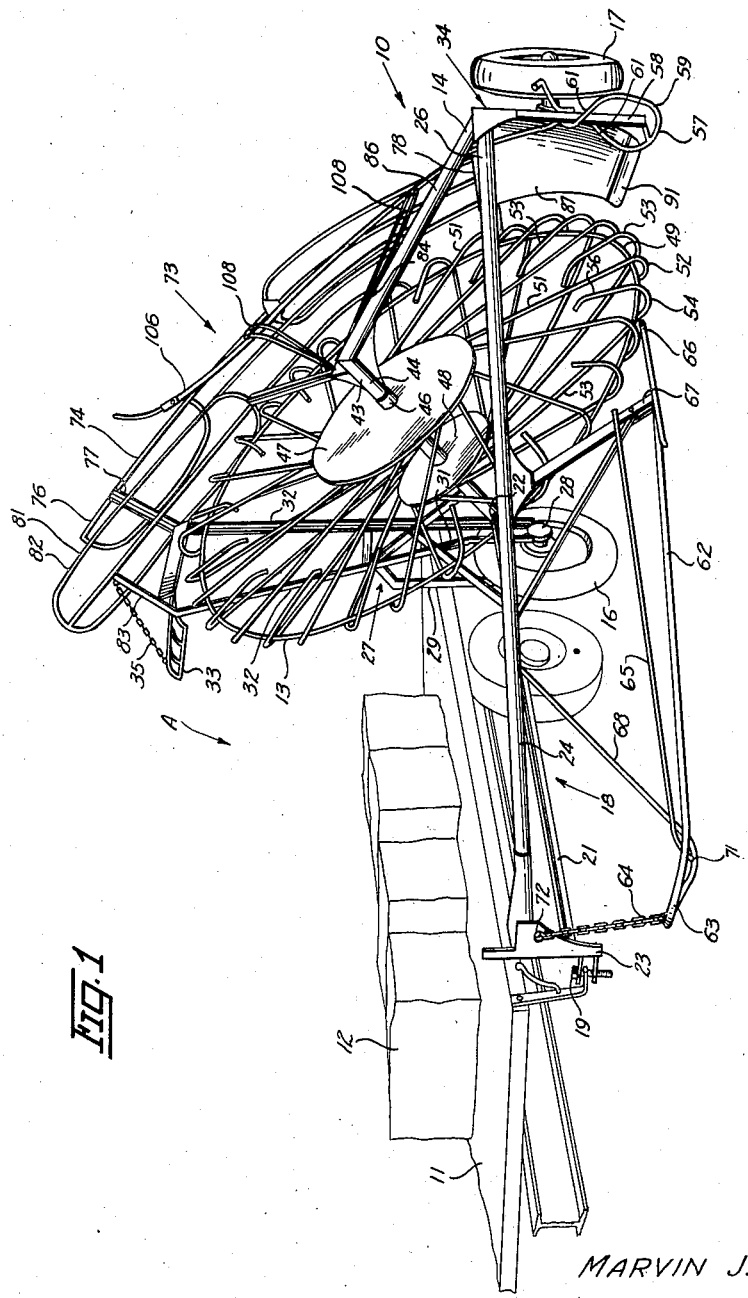
Fig. 1 is a perspective view of the bale loader of this invention, shown in assembly relation with a trailer, only a portion of which is shown, which receives bales from the loader.

With reference to the drawing, the bale loader of this invention, indicated generally at 10, is illustrated in Fig. 1 in assembly relation with a flat bed wagon or trailer 11 adapted to be towed by a tractor or the like (not shown) during operation of the loader 10 to load bales 12 from a field onto the trailer 11. The loader 10 includes an inclined loading wheel 13 mounted on a frame 14 provided with transversely spaced ground wheels 16 and 17 and a forwardly extended tongue structure 18 attached by a pin 19 to the trailer 11 for towing of the loader 10 by the trailer 11.

The tongue structure 18 includes a first forwardly extended member 21 secured at its rear end 22 to the frame 14 at a position adjacent to the ground wheel 16. At its front end, the member 21 is connected to an upright plate 23 releasably attached by the pin 19 to the trailer 11. A second tongue member 24 is similarly connected at its front end to the plate 23 and is connected at its rear end 26 to the frame 14 at a position adjacent the ground wheel 17. It can thus be seen that since the tongue structure 18 is connected to opposite sides of the frame 14 at positions adjacent the ground wheels 16 and 17 that during forward movement of the trailer 11, the loader 10 travels with the trailer 11 in a side by side relation therewith as shown in Fig. 1.

The frame 14 includes a first side frame section 27 supported on and extended upwardly from an axle 28 for the wheel 16. At its lower end, the frame section 27 includes a pair of members 29 and 31 (Figs. 1 to 4, inclusive) arranged on transversely opposite sides of and mounted on the axle 28. The frame section 27 further includes a pair of upwardly diverged frame members 32 which carry a platform 33 arranged above the loading wheel 13 and pivotally supported on the frame members 32 for up and down swinging movement relative thereto. A chain 35 carried by the frame section 27 is releasably attached to the platform 33 for maintaining the platform in a substantially horizontal position when desired.

A second side frame section 34 of the frame 14 is positioned adjacent to and inwardly of the ground wheel 17. The section 34 is substantially upright and includes an upright frame member 36 (Figs. 5 and 6) which is pivotally connected at its lower end at 37 to one end of an arm 38. At its opposite end 39, the arm 38 is rotatably supported on an axle 41 for the wheel 17. The side frame sections 27 and 34 are connected by a beam 42 (Figs. 2 and 3) arranged rearwardly of the loading wheel 13. An inverted V-shape tubular frame member 43 arranged forwardly of the beam 42 is also connected to and extended between the frame end sections 27 and 34.

Rotatably mounted on one leg 44 of the V-shape frame member 43 is the loading wheel 13 which is of a size to extend upwardly to a position adjacent the platform 33. The loading wheel 13 includes a tubular hub member 46 rotatably mounted on the leg 44 and a pair of spaced circular plates or discs 47 and 48 secured in a concentric relation with the hub 46. Arranged about the plates 47 and 48, in a spaced concentric relation therewith and in a plane positioned between the plates 47 and 48 is a rim member 49. A series of spokes 51 are secured at their inner ends to the plate 47 and have their outer end portions 52 curved about and secured to the rim 49. Arranged in an alternating relation with the spokes 51 are a second series of spoke members 53 secured at their inner ends to the plate 48 and having their outer end portions 54 curved about and secured to the rim 49. The spokes 53 are provided with extensions 56 which extend toward the hub plate 47 and are positioned substantially in the plane of the spokes 51 on opposite sides thereof.

It can thus be seen that the spokes 51 and 53 are arranged in an alternating relation, namely, with each spoke 53 being positioned between a pair of spokes 51, about the periphery of the rim 49 with the curved end portions 52 and 54 of the spokes 51 and 53, respectively, being positioned outwardly of the rim 49.

Mounted on the frame 14 and extended forwardly therefrom for guiding bales on the ground onto the loading wheel 13 is a first guide member 57 supported on an upright frame member 58 in the side frame section 34 adjacent the wheel 17. The guide member 57 is of a substantially upright U-shape having an outwardly and forwardly curved base section 59 and a pair of rearwardly extended leg sections 61 secured to the frame member 58. A second rod-shape guide member 62 is positioned forwardly of the frame 14 and is supported at its front end 63 on a chain 64 releasably and adjustably secured to the plate 23. Adjacent its rear end 66, the second guide member 62 is supported by a bar 67 carried by the tubular tongue member 24. A tubular member 68 (Fig. 2) is hingedly connected at 69 to an intermediate portion on the tongue member 21 and extends downwardly and forwardly therefrom, terminating in a ground engageable curved runner portion 71 secured at its front end to the front end 63 of the guide member 62.

During use of the machine 10, the runner 71 travels along the ground surface so that the guide member 62 is spaced above the ground surface for guiding a bale onto the wheel 13. The effective length of the chain 64 is shortened by pulling it through an opening 72 in the plate 23 to lift the runner 71 off the ground during transport of the machine 10, as shown in Fig. 3.

Once a bale to be loaded is received on the wheel 13, a guide frame, indicated generally at 73 (Figs. 1 and 7) insures an upward travel of the bale onto the platform 33. The guide frame 73 includes an outer rail unit 74 having an outwardly flared upper end portion 76 supported on an upward extension 77 of the rear one of the frame members 32 in the side frame section 27. At its lower end, the outer rail unit 74 is connected to a portion 78 of the rear frame member 42 in the main frame 14. As best appears in Fig. 7, the outer rail unit 74 overlies and is positioned adjacent to the rim 49 at the outer periphery of the loading wheel 13. The guide frame 73 further includes an inner rail unit 81 which is positioned inwardly of the wheel 13 in a substantially parallel spaced relation with the outer rail unit 74. The rail units 74 and 81 are spaced apart a distance slightly greater than the width of the largest sized bales with which the loader 10 is to be used. At its upper end 82, the inner rail unit 81 is secured to an extension 83 on the forward one of the frame members 32 in the side frame section 27. At its lower end, the guide rail unit 81 is secured at 84 to a leg 86 of the tubular V-shape main frame member 43. As best appears in Fig. 7, the upper ends 76 and 82 of the guide rails 74 and 81, respectively, are arranged on opposite sides of the platform 33 for guiding a bale from the wheel 13 to a supported position on the platform 33.

An inclined sheet metal scoop member 87 (Fig. 1) is secured at its upper end 88 to the side frame section 34 and the rear frame member 42 for initially tipping a bale onto the wheel 13. The scoop 87 is provided at its lower end 89 with a forwardly extended portion 91 adapted to travel adjacent the ground surface during a loading operation of the loader 10.

It is seen, therefore, that the forwardly extended guide members 57 and 62, the scoop 87, and the guide frame 73 constitute a guide frame structure and cooperate to provide for the reception of a bale to be loaded onto the loader wheel 13, and for upward travel of the bale on the wheel 13.

In the use of the machine 10 to load bales from a field onto the trailer 11, the chain 64 is first manipulated in the opening 72 in the supporting plate 23 so as to hang loosely therefrom and provide for a floating engagement of the runner 71 on the ground surface (Figs. 1, 2 and 4). A loop shape stop or retaining member 96 movably mounted on the end frame section 34 (Figs. 5 and 6) is moved upwardly to release an upper end portion 95 of a tubular handle member 97 therefrom. The handle 97 is secured at its opposite end 98 to the arm 38. As a result, on such release the wheel 13 and the supporting frame 14 move downwardly relative to the rear wheel 17 to a position in which the loader wheel 13 is ground supported. In this position of the wheel 13, the loop shape portions 52 and 54 of the spokes 51 and 53, respectively, engage the ground to provide for rotation of the loading wheel 13, in the direction of the arrow A (Fig. 1), during forward travel of the loader 10. It can thus be seen that the loop shape portions 52 and 54 constitute treads for facilitating ground travel of the loading wheel 13. By virtue of the pivotal support of the arm 38 on the wheel axle 41, the loading wheel 13 is floatingly supported for up and down floating movement in response to a travel of the wheel 13 over uneven ground.

During forward travel the bale loader 10 is manipulated or steered, through a towing machine (not shown) so that bales, which are scattered about the field, are selectively engaged by the guide member 62. By virtue of the inclination of the guide member 62 a bale 100 (Fig. 4) engaged thereby is progressively moved so that its long side 101 is against the guide member 62. The bale 100 then travels along the guide member 62 to the rear end thereof so that it moves in an endwise direction toward the scoop 87. An auxiliary guide member 65 of an irregular shape and extended between the bar 67 and the runner 71 at a position above the guide member 62 insures a guiding action of the member 62. The guide member 57 may engage an end of the bale to further direct the bale onto the scoop 87. As one end of the bale 100 is engaged by the lower end portion 91 of the scoop 87, the bale is progressively lifted onto the scoop 87 and concurrently tipped in a direction toward the wheel 13 as a result of the inclination of the scoop 87 (Fig. 4).

As best appears in Fig. 1, the spokes 51 and 53 of the loading wheel 13 are arranged in what might be termed a trailing relation on the wheel 13. In other words, the spokes 51 and 53 do not extend radially of the wheel 13 but have their outer curved ends 52 and 54 offset peripherally of the wheel 13 in a direction opposite to the direction of rotation of the wheel 13. As a result, increased lengths of the spokes 51 and the spoke extensions 56 are engaged with the bale 100 when the bale is moved onto the wheel 13 by the scoop 87. This increased engagement of the spokes 51 and the spoke extensions 56 with the bale 100 provides for an increased pulling force of the wheel 13 on the bale 100. As a result, a bale 100 is positively engaged by the wheel 13 to prevent slipping of the bale off the wheel. The bale 100 thus moves upwardly with the wheel 13 as the loader 10 is advanced to rotate the wheel 13.

In some instances some of the spokes 51 are provided with bar attachments 103 (Fig. 8) which project upwardly above the spokes 51 and act to positively prevent any slipping movement of a bale on the wheel 13, along with providing an increased propulsive force on a bale being raised. The attachments 103 are preferably spaced from each other a distance slightly greater than the length of a bale.

To further preclude any downward slipping movement of a bale 100 as the bale is moved upwardly on the wheel 13, an elongated hold down bar 106 (Figs. 1 and 7) is extended longitudinally of and positioned between the outer and inner guide rails 74 and 81, respectively. The bar 106 has its lower end 107 secured to the guide member 57. A pair of rod members 108 are secured at their outer ends to the hold down bar 106 and are secured at their inner ends to the leg 44 of the V-shape frame member 43. The rods 108 act to resiliently hold the bar 106 in a position engaged with the top side of a bale moving upwardly on the wheel 13. In other words, and as best appears in Fig. 4, as a bale 100 moves upwardly on the loading wheel 13 it progressively engages the upwardly inclined hold down bar 106 which is yieldably moved upwardly by the bale 100 to thus exert a downward force on the bale 100 insuring travel of the bale with the wheel 13.

As the bale 100 moves upwardly on the loading wheel 13, it engages an upper portion 92 of the inner guide rail 81 which acts to disengage the bale 100 from the wheel 13. In this connection, the trailing relation of the spokes 51 and 53 provide for an increased pushing force on the bale 100 which force moves the bale along the portion 92 of the guide rail 81 thus facilitating movement of the bale off the wheel 13. The portion 92 of the inner guide rail 81 thus acts to guide a bale 100 off the loading wheel 13, which in turn acts to push the bale 100 along the guide rail portion 92 and onto the platform 33. The bale 100 is then readily manually lifted off the platform 33 and placed on the trailer 11.

The machine 10 is towed through a field until all of the bales thereon have been individually engaged by the guide member 62, directed onto the wheel 13, and moved by the wheel 13 onto the platform 33 for removal onto the trailer 11. A complete bale loading operation is thus accomplished in a minimum period of time with the loading device 10 accommodating substantially all standard size bales.

After completion of a bale loading operation, when it is desired to transport the loading machine 10 from the field to a storage shed, the chain 64 is manipulated to lift the runner 71 off the ground, thus moving the guide member 62 upwardly an additional distance above the ground (Fig. 3.) The free end portion of the handle 97 is grasped and swung in a clockwise direction as viewed in Fig. 5 to thus move the loading wheel 13 and the frame 14 upwardly relative to the wheel 17. The handle 97 is swung upwardly until the terminal end 95 thereof is opposite the loop 96 which is then swung downwardly to a position about the terminal end 95 thus releasably locking the lever 97 and the wheel supporting arm 38 in fixed positions. In the fixed position of the lever 97 (Fig. 6) the loading wheel 13 is positively supported at a position above the ground surface.

The loading machine 10 can then be towed alongside of the trailer 11 or independently of the trailer 11. To limit sidewise extension of the device 10, the platform 33 is lowered as shown in Fig. 3 by releasing the supporting chain 35 therefrom.

When it is again desired to use the loader 10 for loading bales, it is only necessary to release the handle 97 from the loop 96 and manipulate the chain 64 so that the runner 71 is engageable with the ground surface. The above described loading operation is then repeated.

Although the invention has been described with respect to a preferred embodiment thereof, it is to be understood that it is not to be so limited, since changes can be made therein which are within the scope of the appended claims.

I claim:

1. A bale loading machine comprising a frame, a pair of transversely spaced ground wheels for said frame, a transverse upwardly inclined bale loading wheel rotatably mounted on said frame at a position between said ground wheels, means supporting one end of said frame on one of said ground wheels, arm means pivotally connected to and extended between the other end of said frame and the other one of said ground wheels for up and down movement of said frame and loading wheel between a first position in which said loading wheel is in engagement with the ground and a second position in which said loading wheel is above the ground surface, and coacting means on said arm means and said frame for releasably locking said arm means in a position corresponding to said second position of said loading wheel.

2. In a bale loader including a portable frame structure, a ground engaging bale loading wheel having spoke members of a rod construction terminating in reversely bent portions so as to constitute a tread about the peripheral portion of the wheel, means rotatably supporting said wheel on said frame structure at an inclination such that a bale carried upwardly by said wheel is frictionally held by said tread against downward movement, and means on said frame structure for guiding a bale from the ground to a supported position on said tread as the loader is advanced.

3. A bale loader comprising a frame structure, a pair of spaced ground wheels secured to said frame to adapt said loader to ground traverse, a bale loading wheel having bale engaging portions on one side of the peripheral portion thereof, means for rotatably supporting said loading wheel on said frame intermediate said ground wheels at such an inclination to the vertical and to the horizontal that a bale may be frictionally held on said wheel by said engaging portions for upward movement therewith, said inclined wheel contacting the ground for driving engagement at a point adjacent to but spaced from one ground wheel, and guide means on said frame structure located adjacent the ground engaging portion of the loading wheel in the space between the ground wheel and the loading wheel for guiding a bale from the ground to a supported position on the loading wheel by tipping said bale over onto the wheel as the loader is advanced.

4. A loading machine comprising a frame structure, a pair of spaced ground wheels secured to said frame to adapt said loader to ground traverse, an object-loading wheel, means on the upper side of said loading wheel and positioned about the periphery thereof for engaging and supporting the object to be loaded, means for rotatably supporting said loading wheel on said frame intermediate said ground wheels at such an inclination to the vertical and to the horizontal that an object supported on said engaging means and carried upwardly on said wheel is frictionally held against downward movement, said inclined wheel contacting the ground for driving engagement at a point adjacent to but spaced from one ground wheel, guide means on said frame structure located adjacent the ground engaging portion of the loading wheel in the space between the ground wheel and the loading wheel for guiding an object from the ground to a supported position on the loading wheel by tipping said bale over onto the wheel, and means on the said frame structure adjacent the upper end of the loading wheel for directing an object off from said wheel in response to a rotation of said loading wheel.

5. A bale loader comprising a frame structure, a pair of spaced ground wheels secured to said frame to adapt said loader to ground traverse, a bale loading wheel having a plurality of bale engaging members extended radially inwardly from the periphery of said wheel so as to constitute a tread thereabout, means for rotatably supporting said loading wheel on said frame structure intermediate said ground wheels at such an inclination to the vertical and to the horizontal that a bale may be frictionally held on said wheel for upward movement therewith, said inclined wheel contacting the ground for driving engagement at a point adjacent to but spaced from one ground wheel, and guide means on said frame structure located adjacent the ground engaging portion of the loading wheel in the space between the ground wheel and the loading wheel for guiding a bale from the ground to a supported position on said tread by tipping said bale over onto the tread as the loader is advanced.

References Cited in the file of this patent

UNITED STATES PATENTS 852,885    Lloyd et al.  ---------- May 7, 1907
2,182,838    Bennett  ------------- Dec. 12, 1939